Sept. 26, 1961 R. PIANA 3,001,333
ROOF COVERING COMPRISING STRUCTURAL MEMBERS
MADE FROM PLASTICS
Filed Aug. 3, 1956 3 Sheets-Sheet 1
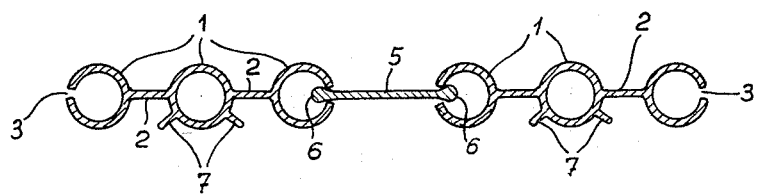
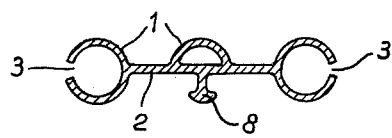
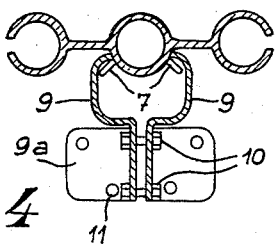
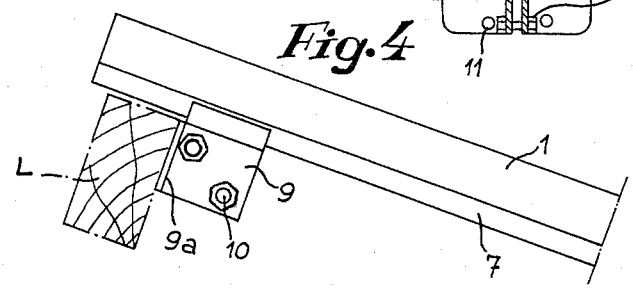
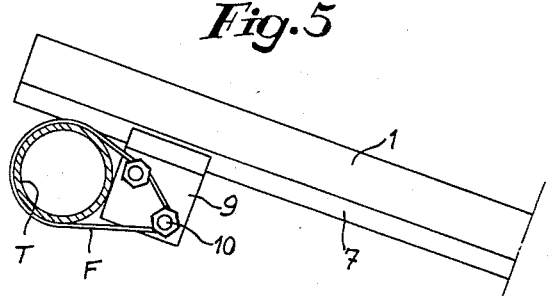

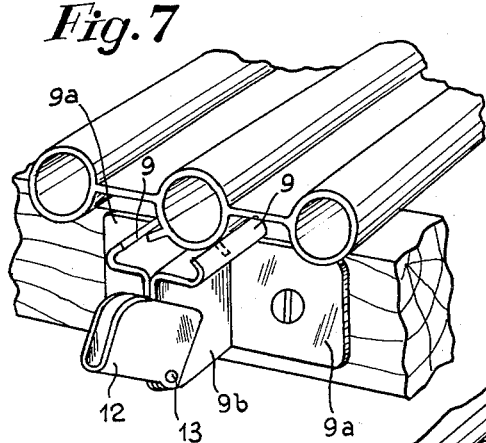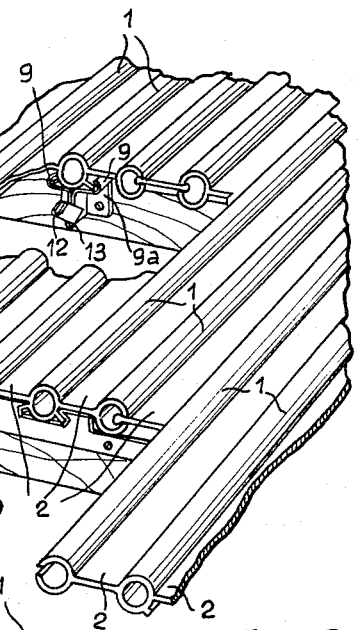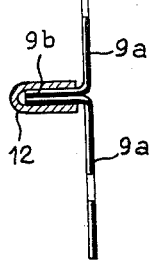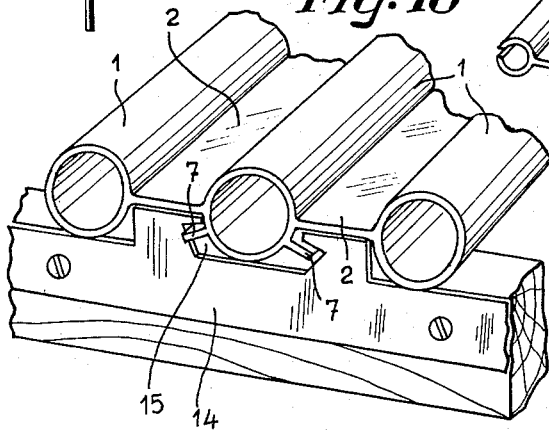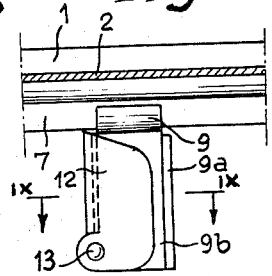

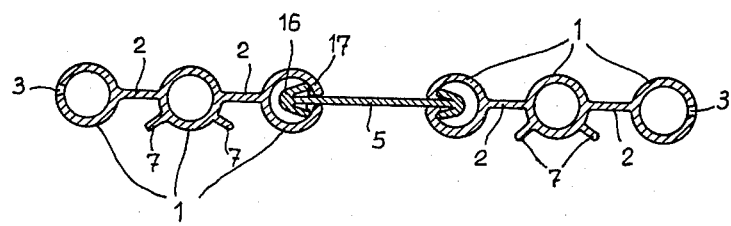
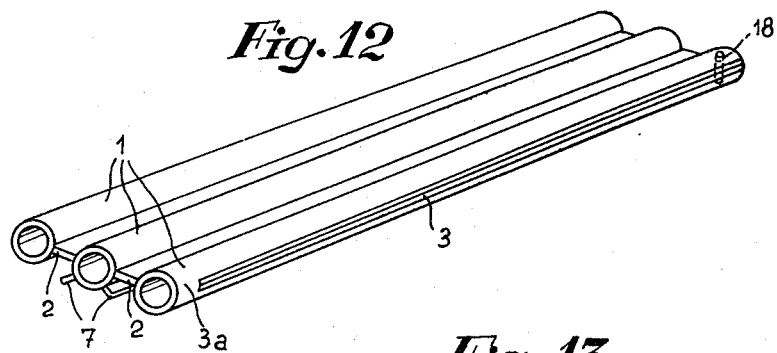
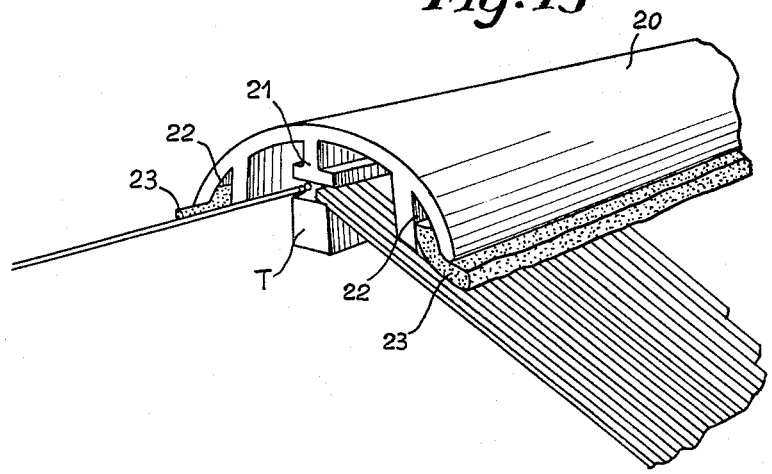

United States Patent Office 3,001,333
Patented Sept. 26, 1961

3,001,333
ROOF COVERING COMPRISING STRUCTURAL MEMBERS MADE FROM PLASTICS
Renato Piana, Turin, Italy, assignor to Edit, di Ing. Renato Piana & C., S.A.S., Turin, Italy
Filed Aug. 3, 1956, Ser. No. 601,876
Claims priority, application Italy May 5, 1956
14 Claims. (Cl. 50—268)

This invention relates to a roof covering, more particularly suitable for sheds, open-door shelters and the like.

The main characteristic feature of the improved roof covering resides in the fact that the covering comprises elongated structural members made from plastics having a hollow longitudinal edge formed with a longitudinal slit and formed at their other longitudinal edge with an enlargement or bead adapted to be engaged by the hollow in an adjacent structural member, said structural members being each formed with projections on their lower face for engaging means for attachment to the supporting framework.

Further characteristic features of this invention will be understood from the following detailed description referring to the accompanying drawings which diagrammatically show by way of example some embodiments of this invention.

FIGURE 1 is a part cross-sectional view of a covering,

FIGURE 2 shows a modification of the tubular element according to FIGURE 1,

FIGURE 3 shows a clamp for attachment of the covering to its supporting framework, said clamp being connected to a portion of the structural member.

FIGURE 4 is a side view of FIGURE 3,

FIGURE 5 shows a modification of FIGURE 4,

FIGURE 6 is a part perspective view of a section of a covering showing the means for attachment of the covering to its supporting framework, FIGURE 7 is a perspective view on an enlarged scale of an attachment clamp;

FIGURE 8 is a side view of FIGURE 7;

FIGURE 9 is a cross-sectional view on line IX—IX of FIGURE 8;

FIGURE 10 is a perspective view of a plate for end attachment of the covering to its supporting framework;

FIGURE 11 is a cross-sectional view of one of the structural members of the covering;

FIGURE 12 is a perspective view of one of the structural members of the covering, and FIGURE 13 is a perspective view of a structural member forming the ridge member of the covering.

Referring to FIGURE 1, the covering comprises two types of structural members made from plastics which are alternately arranged for reciprocal engagement. One type of structural members comprises tubular edge portions 1 connected by flat ribs 2. The tubular edge portions are each formed with a longitudinal slit. These tubular members alternate with members comprising a middle flat portion 5 and bulged edges 6 adapted to engage slits 3 in the first-mentioned structural members in which they are retained by the beads 6.

By reciprocally engaging a suitable member of alternate structural members just described a covering of any desired area will be obtained which is suitable for discharging water and preventing any oozing thereof into the building. Any water penetrating through the slits 3 in the tubular structural members is collected within the latter and conveyed downward.

The tubular structural members are formed at their lower face with wing-shaped projections 7 or, in the modified construction shown in FIGURE 2 with a central projection of T-shape in cross section, for engagement by divided clamps 9 (see FIGURES 3 and 4), the two halves of which are assemblable by means of screws 10 and are provided with bent over flaps 9a in which holes 11 are bored for securing the clamps to the ledges L of the supporting framework. As a result, the covering is secured to the underlying framework without boring any holes in the former which might impair its imperviousness.

In the modified construction shown in FIGURE 5, the covering is secured to the framework comprising transverse tubular members T by means of binding wires F which are passed about the screws 10 fixing the clamps to the structural members of the covering.

One clamp only on each structural member effectively clamps its lower projecting wings, the remaining clamps merely retaining the covering to keep it against being lifted from the framework, while allowing free expansion of the structural members on variations in temperature.

The structural members, which are manufactured by extrusion, may be unlimited in length, with the result that coverings without any discontinuity in a longitudinal direction can be laid.

The flat structural members 5 can be made of translucent material, which will let light through to the inside.

The covering can be manufactured from one type of structural members only having at one edge a hollow and slit and at its other edge a bulged portion adapted to become engaged by the slit in the adjacent member.

In the example shown in FIGURES 6 to 9 the clamps for securing the structural members to the framework each comprise a pair of plates denoted by 9 adapted to engage with the wings on the structural members and formed with bent over portions 9a, 9b, respectively, the former serving for attachment to the ledges of the framework, the latter being adapted to juxtapose with one another and being connected together by means of a pivot 13. A plate 12 bent to U-shape is adapted to swing about the pivot 13, fitting on the portions 9b of the pair of plates for clamping the latter. Clamping of the two clamp halves by means of the U-shaped plate affords a quick attachment, advantageously replacing bolts or screws.

The end portions of the covering are advantageously secured to the framework by means of metal plates 14 (FIGURES 6 and 10) of suitable length, formed with spaced seating 15 substantially of dovetail shape. The seatings 15 retain the structural members of the covering at the lower projections 7, inasmuch as the ends of the seatings act on the top portion of said projection, the lower central portion of the seatings acting on the tubular portion of the structural member, which results in a pressure by the plate against the extensions on the structural members by which the latter are retained.

In the modified construction shown in FIGURES 11 and 12 the structural members 5 are formed at their edges with arrow-shaped bulged portions 16, which are adapted to snap into the slits 3 in the elements 1 having tubular edges under the action of a transversely directed thrust. The tubular members 1 are formed with inwardly directed flanges 17 at the slit edges, adapted to cooperate with arrow-shaped bulges 16 for more efficiently retaining the structural members.

The slits 3 are preferably interrupted at 3a at one end at least in order to avoid a relative displacement of the structural members.

Auxiliary retaining members, such as cross pins 18 are conveniently provided at the open ends of the slits 3.

The configuration of the structural members just described improves assembly of the covering, inasmuch as the various elements can be reciprocally engaged by a transverse instead of a longitudinal displacement.

According to FIGURE 13 the covering comprises a ridge member made of plastics, comprising a tile 20 having a lateral extension 21 serving for attachment to the ridge girder T of the roof and two seatings 22 at the edges each adapted to receive a packing of yieldable material, such as expanded resin for the purpose of a tight seal between the tile 20 and the structural members of the covering.

It will be understood that within the principle of this invention constructional details and embodiments can be widely varied from the embodiments described and illustrated by way of example, without departing from the scope of the appended claims.

What I claim is:

1. A roof structure for buildings and the like comprising in combination with a supporting structure first and second roof-covering members of synthetic plastic, supported on said structure in parallel relationship with one another with the first members alternating with the second members in their assembled position upon said structure, each first roof-covering member comprising three interconnected parallel tubular elements having co-planar axes, said tubular elements being equally laterally spaced, and flat ribs integral with said tubular elements and disposed between said tubular elements in a plane extending through the axes of said tubular elements to interconnect the latter, whereby the lateral configuration of each first member is defined by said three tubular elements with said intervening integral flat ribs, the lateral dimension of each of said first members being at least equal to the lateral dimension of each second member, the tubular elements at the edges of each of said first members each having a longitudinal slit therein diametrically opposite said ribs to provide communication between the cylindrical recess inside said tubular elements with the exterior of said elements, the central tubular element of each of said first members having on one side of the member a pair of wing-shaped continuous longitudinal projections symmetrically arranged with respect to a plane perpendicular to said member and extending through the axis of said central tubular element, mechanical clamp means secured to said supporting structure and engaging each of said wing-shaped projections and being effective to secure firmly but removably and detachably said first roof-covering members to said supporting structure, and each second roof-covering member comprising a flat strip provided with integral longitudinal edge beads disposed interiorly of the cylindrical recesses of the tubular elements at the edges of the adjacent first roof-covering members, the tubular element at the edge of one first member being spaced from the opposed element of the next adjacent first member by a distance equalling the spacing between the beads of each of said second members.

2. Roof structure as claimed in claim 1, wherein each securing means comprises two sheet metal elements, hook-shaped portions on said sheet metal elements for engaging the wing-shaped projections on the roof-covering members, interconnecting screws for the elements and means for connecting the elements to the supporting structure.

3. Roof structure as claimed in claim 2, wherein the connecting means for the elements to the supporting structure are in the form of wires wound about portions of the supporting structure and element interconnecting screws.

4. Roof structure as claimed in claim 1, wherein each securing means comprises two sheet metal elements, hook-shaped portions on said elements for engaging the wing-shaped projections on the roof-covering members, an interconnecting pivot for the two elements and U-shaped pincers swinging about the element connecting pivot for fitting on the elements and holding them in position.

5. Roof structure as claimed in claim 1, wherein the engaging means for the wing-shaped projections on the roof-covering members comprises blades arranged transversely of the members secured to the supporting structure and seats in said blades for tight engagement of said projections.

6. Roof structure as claimed in claim 5, in which the seats in the blades are of dovetail shape.

7. A roof structure for buildings and the like comprising in combination with a supporting structure first and second roof-covering members of synthetic plastic, supported on said structure in parallel relationship with one another with the first members alternating with the second members in their assembled position upon said structure, each first roof-covering member comprising three interconnected parallel tubular elements having co-planar axes, said tubular elements being equally laterally spaced, and flat ribs integral with said tubular elements and disposed between said tubular elements in a plane extending through the axes of said tubular elements to interconnect the latter, whereby the lateral configuration of each first member is defined by said three tubular elements with said intervening integral flat ribs, the lateral dimension of each of said first members being at least equal to the lateral dimension of each second member, the tubular elements at the edges of each of said first members each having a longitudinal slit therein diametrically opposite said ribs to provide communication between the cylindrical recess inside said tubular elements with the exterior of said elements, the central tubular element of each of said first members having on one side of the member a pair of wing-shaped continuous longitudinal projections symmetrically arranged with respect to a plane perpendicular to said member and extending through the axis of said central tubular element, each second roof-covering member comprising a flat strip provided with integral longitudinal edge beads disposed interiorly of the cylindrical recesses of the tubular elements at the edges of the adjacent first roof-covering members, the tubular element at the edge of one first member being spaced from the opposed element of the next adjacent first member by a distance equalling the spacing between the beads of each of said second members, and hook-shaped clamps engaging said wing-shaped projections, said clamps having projections extending perpendicularly to said first members, means removably interconnecting said clamps and firmly engaging them with said wing-shaped projections on said first members, bent over flaps on said projections of said clamps extending at right angles to the latter, said flaps having bores therein for the passage of screws securing said clamps to said supporting structure.

8. A roof structure for buildings and the like comprising in combination with a supporting structure first and second roof-covering members of synthetic plastic, supported on said structure in parallel relationship with one another with the first members alternating with the second members in their assembled position upon said structure, each first roof-covering member comprising interconnected parallel tubular elements having co-planar axes, and including a tubular element at each longitudinal edge of each first member, said tubular elements being laterally spaced and at least one rib disposed between and integral with said tubular elements in a plane extending through the axes of said tubular elements to interconnect the latter, whereby the lateral configuration of each first member is defined by said interconnected tubular elements with said intervening integral flat ribs, the lateral dimension of each of said first members being at least equal to the lateral dimension of each second member, the tubular elements at the edges of each of said first members each having a longitudinal slit therein diametrically opposite said rib to provide communication between the cylindrical recess inside said tubular elements with the exterior of said elements, each of said first members having on one side of the member at the center thereof at least one continuous longitudinal projection symmetrically arranged with respect to a plane perpendicular to said member extending through the axis of said central tubular element, mechanical clamp means secured to said supporting structure and engaging said projection and being effective to secure firmly but removably and detachably said first roof-covering members to said supporting structure, and each second roof-covering member comprising a flat strip provided with integral longitudinal edge beads disposed interiorly of the cylindrical recesses of the tubular elements at the edges of the adjacent first roof-covering members, the tubular element at the edge of one first member being spaced from the opposed element of the next adjacent first member by a distance equalling the spacing between the beads of each of said second members.

9. A roof structure for buildings and the like comprising in combination with a supporting structure first and second roof-covering members of synthetic plastic, supported on said structure in parallel relationship with one another with the first members alternating with the second members in their assembled position upon said structure, each first roof-covering member comprising a tubular element at each longitudinal edge of each first member, said tubular elements being laterally spaced and a flat rib connecting said tubular elements and lying in a plane extending through the axes of said tubular elements, whereby the lateral configuration of each first member is defined by said tubular elements with said intervening at least one integral flat rib, the lateral dimension of each of said first member being at least equal to the lateral dimension of each second member, a semicircular hollow rib on one side of said flat rib, said hollow rib being arranged at the middle longitudinal plane of the symmetry of said member, and a central longitudinal projection of T-shape in cross section on the other side of said flat rib, mechanical clamp means secured to said supporting structure and engaging said T-shaped projection and being effective to secure firmly but removably and detachably said roof-covering members of the first type to said supporting structure, the tubular elements at the edges of each of said first members each having a longitudinal slit therein diametrically opposite said flat rib to provide communication between the cylindrical recess inside said tubular elements with the exterior of said elements, and each second roof-covering member comprising a flat strip provided with integral longitudinal edge beads disposed interiorly of the cylindrical recesses of the tubular elements at the edges of the adjacent first roof-covering members, the tubular element at the edge of one first member being spaced from the opposed element of the next adjacent first member by a distance equalling the spacing between the beads of each of said second members.

10. Roof structure as claimed in claim 9, wherein the beads are of arrow shape.

11. Roof structure as claimed in claim 10, comprising ribs within the longitudinal recesses in the first members arranged on the slit edges for engagement of the wings of the arrow-shaped beads on the second members.

12. Roof structure as claimed in claim 9, wherein the slits are closed at least at one end of their respective roof-covering member.

13. Roof structure as claimed in claim 12, wherein additional retaining means is provided at the ends of the roof-covering members in which the slits are closed.

14. Roof structure as claimed in claim 13, wherein the additional retaining means is in the form of cross pins.

References Cited in the file of this patent

UNITED STATES PATENTS

| | | |
|---|---|---|
| 395,306 | Andre | Jan. 1, 1889 |
| 2,066,255 | Dempsey | Dec. 29, 1936 |
| 2,294,555 | Hendrie | Sept. 1, 1942 |
| 2,323,417 | Pauli | July 6, 1943 |
| 2,354,485 | Slaughter | July 25, 1944 |
| 2,388,297 | Slaughter | Nov. 6, 1945 |
| 2,467,604 | Tinnerman et al. | Apr. 19, 1949 |
| 2,685,851 | Zachman | Aug. 10, 1954 |
| 2,699,128 | Johnson | Jan. 11, 1955 |

OTHER REFERENCES

House and Home, pp. 123–129, 132, September 1956.